United States Patent [19]

Ishikawa

[11] Patent Number: 5,510,607
[45] Date of Patent: Apr. 23, 1996

[54] OPTICAL CODE READER HAVING AN ILLUMINATION LIGHT SOURCE EMITTING LIGHT FOR AT LEAST A PRESET PERIOD RESPONSIVE TO OPERATION OF A TRIGGER SWITCH

[75] Inventor: Mamoru Ishikawa, Fuji, Japan

[73] Assignee: Kabushiki Kaisha TEC, Shizuoka, Japan

[21] Appl. No.: 313,449

[22] Filed: Sep. 27, 1994

[30] Foreign Application Priority Data

Sep. 28, 1993 [JP] Japan .................................. 5-241570

[51] Int. Cl.⁶ ............................................... G06K 7/10
[52] U.S. Cl. ........................ 235/472; 235/462; 235/455
[58] Field of Search .................................. 235/472, 462, 235/455

[56] References Cited

U.S. PATENT DOCUMENTS

| | | | |
|---|---|---|---|
| 4,387,297 | 6/1983 | Swartz et al. | 235/462 |
| 4,639,606 | 1/1987 | Boles et al. | 235/455 X |
| 5,021,642 | 6/1991 | Chadima, Jr. et al. | 235/472 |

FOREIGN PATENT DOCUMENTS 0385478  9/1990  European Pat. Off. .
63-67692  3/1988  Japan .

Primary Examiner—Donald T. Hajec
Assistant Examiner—Michael G. Lee
Attorney, Agent, or Firm—Frishauf, Holtz, Goodman, Langer & Chick

[57] ABSTRACT

An optical code reader includes a reading window, a reading control circuit for sensing an image of a 2-dimensional code via the reading window and for converting the sensed image into image data, and a portable frame having an opening used as the reading window, for accommodating the reading control circuit. In the optical code reader, the reading control circuit includes a trigger switch for issuing a reading instruction with the reading window set within a preset distance from the 2-dimensional code, an illumination light source for applying an illumination light via the reading window for a preset period after the reading instruction is issued by the trigger switch, an image sensing section for sensing the image of the 2-dimensional code based on a reflected light obtained when the 2-dimensional code is illuminated by the illumination light source, and a light source controller for elongating the period of activation of the illumination light source when the reading instruction is continuously issued for a period longer than the preset period.

6 Claims, 3 Drawing Sheets

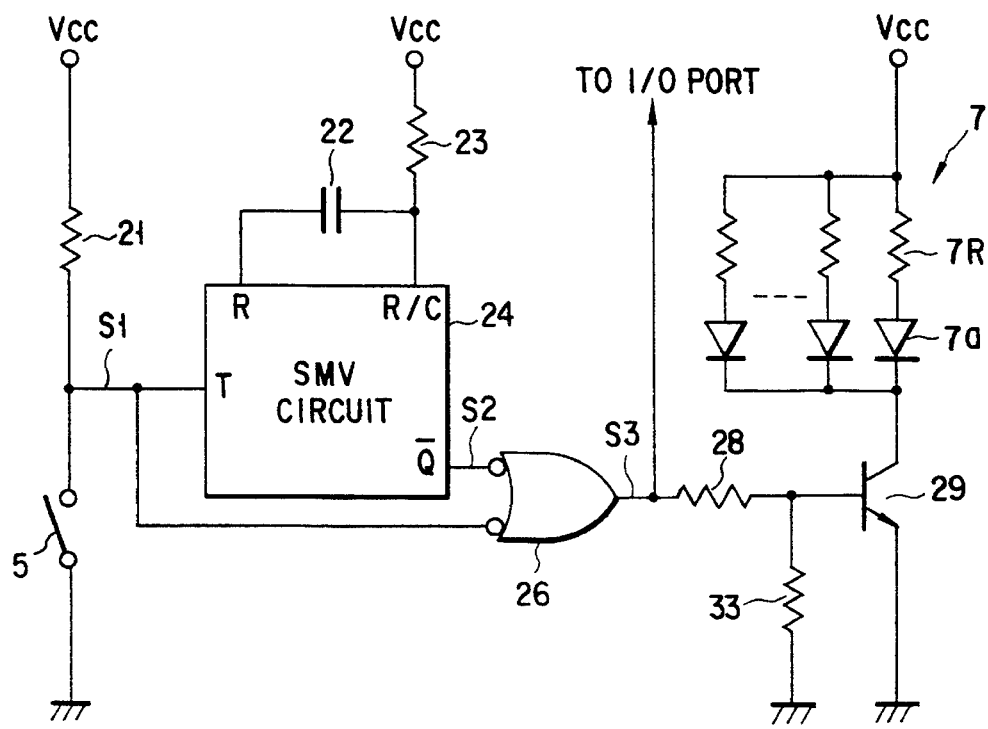
F I G. 6
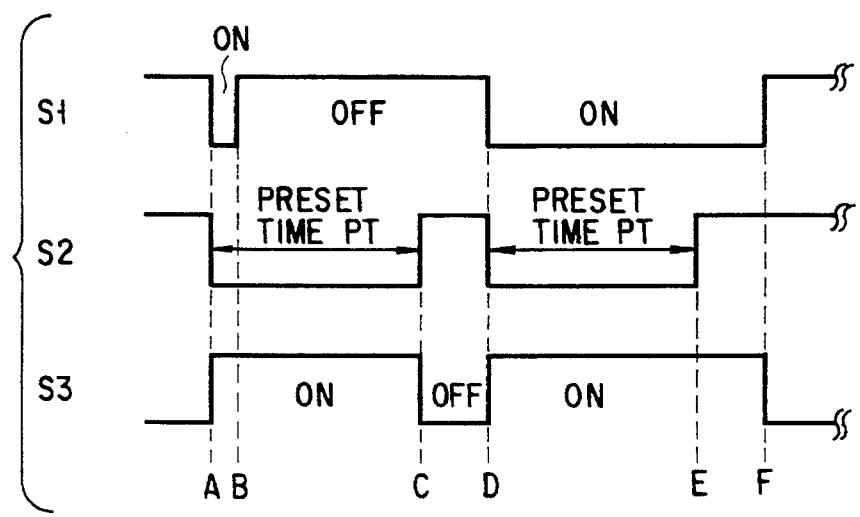
F I G. 7

OPTICAL CODE READER HAVING AN ILLUMINATION LIGHT SOURCE EMITTING LIGHT FOR AT LEAST A PRESET PERIOD RESPONSIVE TO OPERATION OF A TRIGGER SWITCH

BACKGROUND OF THE INVENTION

1. Field of the Invention

This invention relates to an optical code reader for reading a 2-dimensional code affixed to an article, and more particularly to an optical code reader which can be held by hand and set close to the 2-dimensional code at the time of reading.

2. Description of the Related Art

Most supermarkets utilize bar codes printed on article labels for sales registration. The bar code represents an article code by a combination of bars linearly arranged and is optically read by a handy type bar code scanner which can be held by hand and set close to and substantially in contact with the bar code at the time of reading, for example. In recent years, the application fields of bar codes are expanding to factories, distribution industries, service businesses and the like. In these application fields, it is necessary to express article information other than the article code by use of bar codes for the article management. Therefore, the recording capacity of bar codes tends to become insufficient. In this condition, 2-dimensional codes such as multi-bar codes and matrix array codes are developed to treat a large amount of article information.

The conventional 2-dimensional code scanner is constructed by connecting a TV camera, TV monitor and image processing device via cables, for example. The TV camera takes an image of a 2-dimensional code printed on the article label under the interior lighting, the TV monitor displays the image of the 2-dimensional code taken by the TV camera, and the image processing device effects an image process of deriving article information from the image of the 2-dimensional code. For example, the article information is transferred to an exterior host computer connected to the image processing device via a communication circuit.

However, the 2-dimensional code scanner is large, heavy and expensive. Further, the operator is required to set the article label in position perpendicular to the optical axis of the TV camera and must adjust the focus of the TV camera according to the distance between the TV camera and the label and adjust the aperture of the TV camera according to the brightness of the interior lighting. This makes the start of reading delayed. It is considered that the above problem can be solved by constructing the 2-dimensional code scanner so as to be set close to and substantially in contact with the label like the handy type bar code scanner.

Since the 2-dimensional code scanner interrupts the interior lighting when it is set close to the 2-dimensional code, it is necessary to provide an illumination light source for illuminating the 2-dimensional code instead of the interior lighting. It is preferable to activate the illumination light source only for an operation period of a reading circuit driven by operation of a trigger switch, for example, since the power consumption can be lowered. However, the 2-dimensional code cannot be read when the 2-dimensional code is set partly out of the reading range. If the operation period of the reading circuit is set to be relatively long so as to provide sufficient time for correcting the position of the 2-dimensional code, it becomes impossible to rapidly read a large number of 2-dimensional codes. Further, if the operation period of the reading circuit is changed according to the period in which the trigger switch is kept depressed, much attention must be paid to the operation of the trigger switch so as not to interrupt the reading operation.

SUMMARY OF THE INVENTION

An object of this invention is to provide an optical code reader capable of saving the power consumption without degrading the reading speed or operability.

The above object can be attained by an optical code reader comprising a reading window; a reading section for sensing an image of a 2-dimensional code via the reading window and for converting the sensed image into image data; and a portable frame having an opening used as the reading window, for accommodating the reading section; wherein the reading section includes a trigger switch for issuing a reading instruction in a state where the reading window is set within a preset distance from the 2-dimensional code, an illumination light source for applying an illumination light via the reading window for a preset period after the reading instruction is issued by the trigger switch, an image sensing section for sensing the image of the 2-dimensional code based on a reflected light obtained when the 2-dimensional code is illuminated by the illumination light source, and an illumination light source controlling section for elongating the period of activation of the illumination light source when the reading instruction is continuously issued for a period longer than the preset period.

In the above optical code reader, if the reading instruction is issued by operation of the trigger switch, the illumination light source emits an illumination light for a preset period. Therefore, even if the reading instruction is interrupted in the preset period, the image sensing section can continuously effect the image sensing operation for the 2-dimensional code. Thus, the operator is not required to continuously operate the trigger switch until the reading of the 2-dimensional code is completed. Further, the light source controlling section elongates the period of activation of the illumination light source when the reading instruction is continuously issued for a period longer than the preset period. Therefore, the operator can correct the position of the 2-dimensional code while operating the trigger switch to issue the reading instruction. As a result, the optical code reader can save the power consumption without degrading the reading speed or operability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 is a diagram showing part of a light source controller for controlling an illumination light source shown in FIG. 5; and FIG. 7 is a time chart for illustrating the operation of the circuit shown in FIG. 6.

DETAILED DESCRIPTION OF THE PREFERRED EMBODIMENTS

Figure 1:
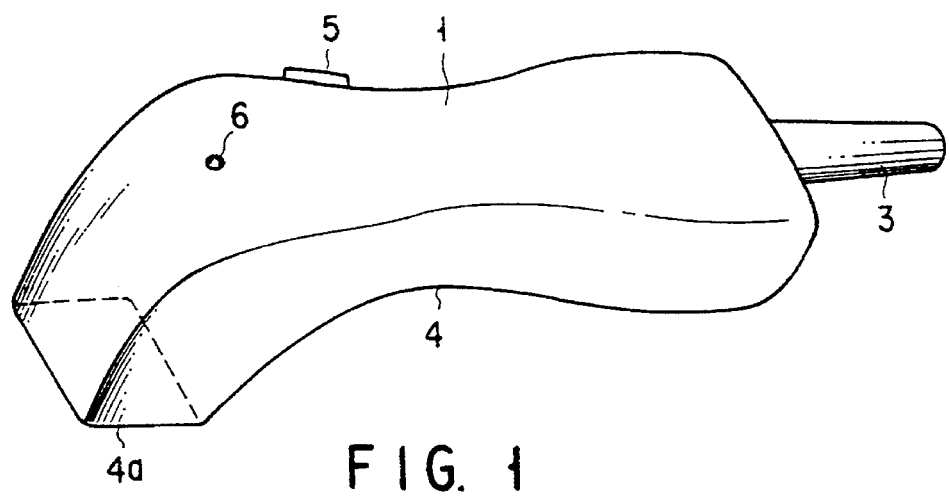
FIG. 1 is a perspective view showing the appearance of a 2-dimensional code scanner according to one embodiment of this invention.
Figure 2:
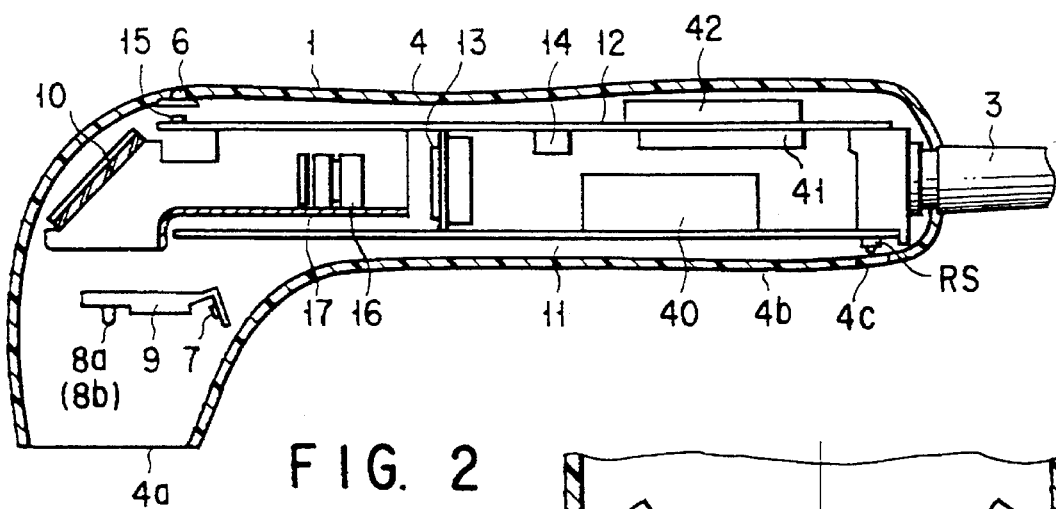
FIG. 2 is a cross sectional view schematically showing the internal structure of the 2-dimensional code scanner shown in FIG. 1.

There will now be described 2-dimensional code scanner according to an embodiment of this invention with reference to the accompanying drawings. FIG. 1 shows the appearance of a 2-dimensional code scanner 1 and FIG. 2 shows the internal structure of the 2-dimensional code scanner 1. The 2-dimensional code scanner 1 includes a plastic frame 4 of hollow structure for accommodating various components shown in FIG. 2. The frame 4 can be divided into upper and lower portions which are combined into one by fitting and/or screwing. The frame 4 further has 2-dimensional reading window 4a formed in the top end portion and an insertion port for a cable 3 for connecting the 2-dimensional code scanner 1 to an external data processing device, for example, host computer at the rear end portion thereof. The cable 3 includes a power line and a data line and fixed in the insertion port by use of a protection member such as rubber bush. The rear end portion of the frame 4 is used as a grip portion 4b. A reset hole 4c is formed adjacent to the insertion port below the grip portion 4b. The reading window 4a is a rectangular opening having dimensions slightly larger than those of the 2-dimensional code to be read and is set such that the axis perpendicular to the plane of the reading window 4a is set at an angle larger than at least 90 degrees, for example, 110 degrees with respect to the central axis of the grip portion 4b. The 2-dimensional code scanner 1 has a trigger switch 5 projecting from the side surface of the frame 4 and a semi-transparent window member 6 mounted on the upper surface of the frame 4. In the internal space of the frame 4, an illumination light source 7, guide light source 8, fixed plate 9, deflection mirror 10, first circuit board 11, second circuit board 12, area CCD 13, buzzer 14, indicator LED 15, lens block 16, filter 17, and other components are disposed. The trigger switch 5 is operated by the operator to instruct the reading of a 2-dimensional code in a state where the reading window 4a is set within a preset distance D of approx. 20 mm from the 2-dimensional code. The buzzer 14 and indicator LED 15 are used to inform the operator of a reading error and completion of the reading. A light from the indicator LED 15 is emitted to the exterior.

Figure 3:
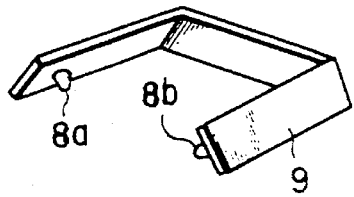
FIG. 3 is a perspective view showing a guide light source shown in FIG. 2.
Figure 4:
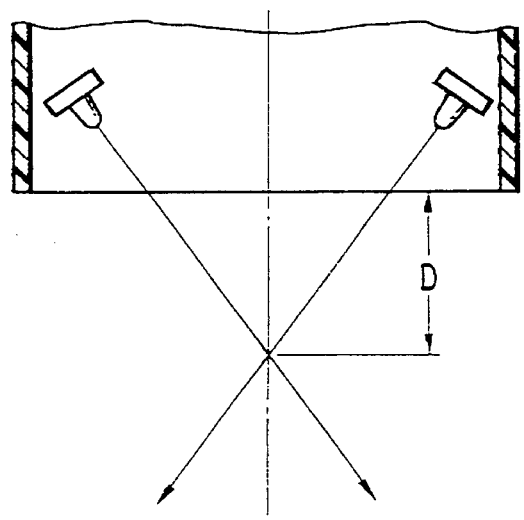
FIG. 4 is a view showing spot beam lights emitted from the guide light source shown in FIG. 3.

The illumination light source 7 and guide light source 8 are disposed in a deeper position than the reading window 4a. The illumination light source 7 includes a plurality of illumination LEDs 7a arranged in a row to emit illumination lights to the exterior via the reading window 4a and a diffusion lens (not shown) of plastic for uniformly diffusing the illumination lights from the illumination LEDs 7a and is mounted on the frame 4 at such an angle that the entire portion of the 2-dimensional code can be illuminated in a reading range defined by the reading window 4a. The guide light source 8 includes first and second spot beam LEDs 8a and 8b. The spot beam LEDs 8a and 8b are mounted on the frame 4 together with the fixed plate 9. As shown in FIG. 3, the fixed plate 9 is previously formed so as not to interrupt the optical path of light reflected from the 2-dimensional code and is used to arrange the spot beam LEDs 8a and 8b so as to permit the beam lights to be emitted from the reading window 4a symmetrically with respect to a central axis passing the center of the plane of the reading window 4a at right angles as shown in FIG. 4. The angle between the spot beam LEDs 8a and 8b is set such that the guide beam lights will intersect each other at a preset distance D (=20 mm) from the reading window 4a along the above central axis. With this arrangement, a single spot in the 2-dimensional code is indicated by the guide beam lights when the reading window 4a comes to a position at the preset distance D from the 2-dimensional code.

The deflection mirror 10 is disposed in a deeper position than the illumination light source 7 and is set at a preset angle with the plane of the reading window to reflect the light incident thereon from the 2-dimensional code via the reading window 4a in a direction towards the area CCD 13. The lens block 16 and filter 17 are disposed as optical components on the optical path connecting the deflection mirror 10 and the area CCD 13. The filter 17 is used to attenuate unwanted extraneous light and the lens block 16 is used to guide the reflected light from the deflection mirror 10 on to the light receiving surface of the area CCD 13 and form an image of the 2-dimensional code on the light receiving surface. The lens block 16 includes an automatic aperture mechanism for adjusting the transmission light amount to adequately adjust the brightness of the image formed on the light receiving surface of the area CCD 13 and group lenses for sufficiently suppressing the distortion of the image. The area CCD 13 is a solid state sensing device for sensing an image formed on the light receiving surface of the area CCD 13 and converting the sensed image into a video signal. The area CCD 13 has a large number of photo-elements arranged in a matrix form on the light receiving surface thereof and the number of effective photo-elements is set to at least 250,000. The focus of the lens block 16 is so set that an image with contrast ratio which permits the video signal to be binary-coded can be obtained on the light receiving surface of the area CCD 13 when the reading window 4a has come close to a position at a distance of 10 mm or less from the 2-dimensional code. (The number of effective photo-elements is set to 400,000 or more when the 2-dimensional code is formed with high density. The group lenses of the lens block 16 may be subjected to reflection preventing coating to prevent occurrence of ghost due to surface reflection. The group lenses may be replaced by aspherical lenses which can suppress the distortion of the image on the light receiving surface of the area CCD 13. Further, the deflection mirror 10 may be replaced by a prism).

The first and second circuit boards 11 and 12 are circuit boards having various electronic parts mounted on one surface or both surfaces thereof. The electronic parts constitute a reading control circuit in cooperation with the area CCD 13. The reading control circuit is electrically connected to the trigger switch 5, illumination light source 7, guide light source 8, buzzer 14 and indicator LED 15.

Figure 5:
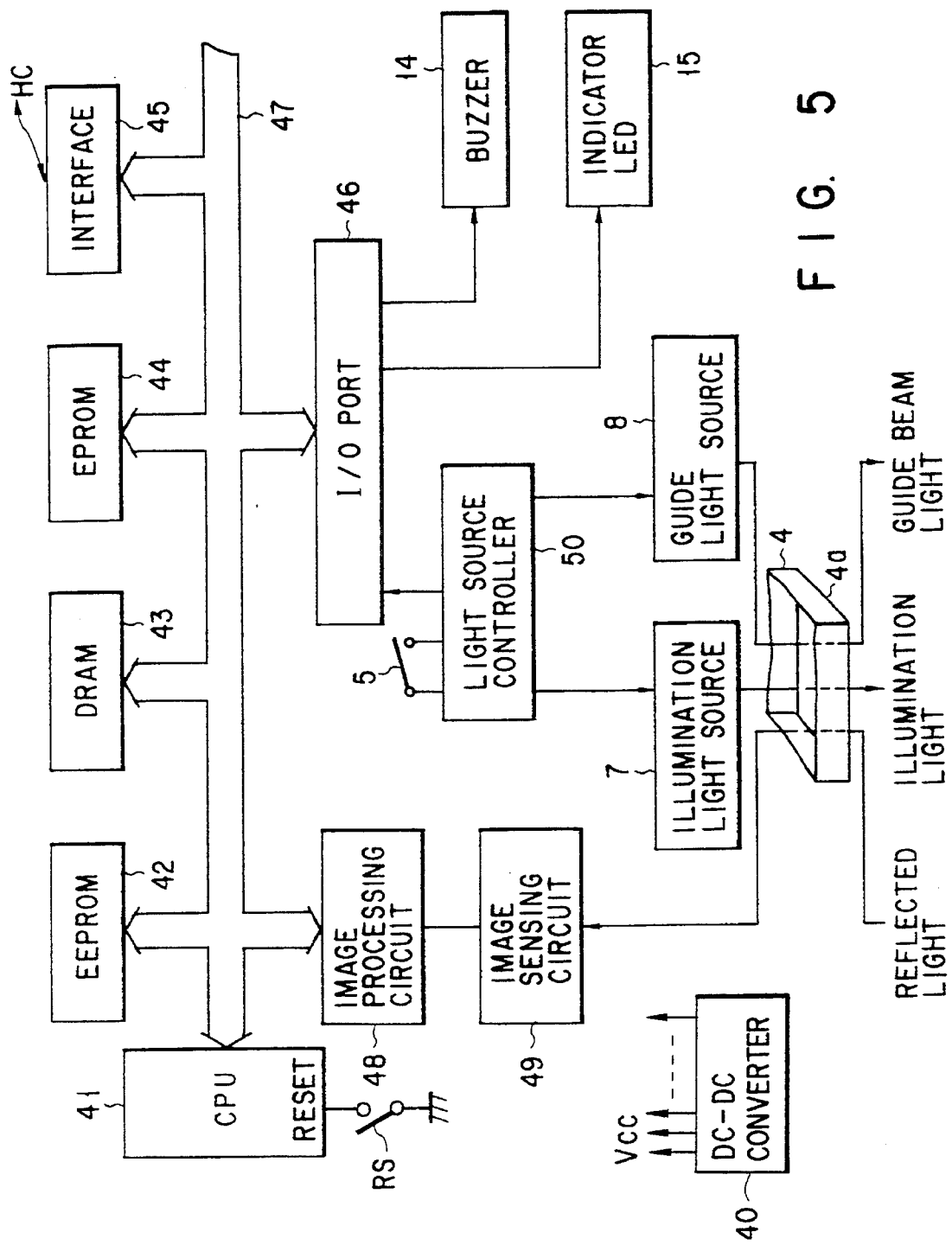
FIG. 5 is a diagram showing the circuit construction of the 2-dimensional code scanner shown in FIG. 2.

FIG. 5 schematically shows the construction of the reading control circuit.

The reading control circuit has a CPU 41, EEPROM 42, DRAM 43, EPROM 44, serial interface 45, input/output port 46, bus line 47, image processing circuit 48, image sensing circuit 49 and light source controller 50. The CPU 41 is connected to the EEPROM 42, DRAM 43, EPROM 44, serial interface 45, input/output port 46, and image processing circuit 48 via the bus line 47. The image processing circuit 48 is connected to the image sensing circuit 49 including the area CCD 13. The input/output port 46 is connected to the light source controller 50, buzzer 14 and indicator LED 15. The light source controller 50 is connected to the trigger switch 5, illumination light source 7 and guide light source 8.

The CPU 41 effects the reading control process for controlling the above various components to read the 2-dimensional code. The EEPROM 42 stores the control program for the reading control process and initial set-up data. The DRAM 43 temporarily stores various data. A plurality of memory areas are set in the DRAM 43 to store the above various data in the reading control process. The EPROM 44 stores a conversion table used for converting black/white array data of the 2-dimensional code into article information such as an article code. The interface 45 effects the serial communication with the host computer via the cable 3. The image sensing circuit 49 causes the area CCD 13 to sense an image of the 2-dimensional code, amplifies an output voltage of the area CCD 13 corresponding to the amount of charge derived from each of the photo-elements at a preset clock cycle and outputs the amplified output voltage as an analog video signal. The image processing circuit 48 converts the analog video signal from the image sensing circuit 49 into dot image data in synchronism with the above clock cycle, extracts a portion corresponding to the 2-dimensional code from the dot image data, and then effects the imaging process for creating the black/white array data based on the extracted image data. The light source controller 50 performs a control of driving the illumination light source 7 and guide light source 8 based on the state of the trigger switch 5. The input/output port 46 supplies a drive control signal for the illumination light source 7 from the light source controller 50 to the CPU 41 and supplies a drive control signal for the buzzer 14 and indicator LED 15 from the CPU 41 to these components. The image processing circuit 48 and image sensing circuit 49 are mounted on the first circuit board 11 side together with a DC-DC converter 40 and a mechanical reset button RS and the other circuits are mounted on the second circuit board 12. The DC-DC converter 40 receives a DC power supply voltage supplied from the host computer via the cable 3 and converts the received received power supply voltage into various DC voltages required for the various components. The reset button RS is operated to reset (initialize) the CPU 41 when the host computer or CPU 41 runs away from its normal operation and communication between the 2-dimensional code and the host computer cannot be effected.

Now, the operation of the 2-dimensional code scanner is schematically explained.

When the power supply of the reading control circuit is turned on, the circuit components are initialized in the reading control process and the guide light source 8 is turned on by the light source controller 50. The operator holds the 2-dimensional code scanner by hand and sets the reading window 4a closer to the 2-dimensional code. At this time, the positional deviation of the 2-dimensional code from the center of the reading range is corrected by referring to the guide beam light from the guide light source 8. The trigger switch 5 is depressed after the reading window 4a is set at a distance of 10 mm or less from the 2-dimensional code.

When the light source controller 50 detects the depression of the trigger switch 5, the illumination light source 7 is turned on instead of the guide light source 8. The light from the illumination light source 7 is applied to the 2-dimensional code, and the reflected light from the 2-dimensional code is guided to the light receiving surface of the area CCD 13 via the deflection mirror 10, filter 17 and lens block 16, and forms an image as an image of the 2-dimensional code. When the image is sensed by the area CCD 13, the image sensing circuit 49 amplifies an output voltage of the area CCD 13 corresponding to the amount of charge derived from each of the photo-elements at a preset clock cycle and supplies the amplified output voltage to the image processing circuit 48 as an analog video signal. The image processing circuit 48 converts the analog video signal into dot image data in synchronism with the above clock cycle, extracts a portion corresponding to the 2-dimensional code from the dot image data, and then effects the imaging process for creating black/white array data based on the extracted image data.

The CPU 41 starts the decoding process as part of the reading control process in response to a drive control signal supplied from the light source controller 50 via the input/output port 46 when the illumination light source 7 is turned on. In the decoding process, the CPU 41 stores the black/white array data derived from the image processing circuit 48 into the DRAM 43, and converts the black/white array data into article information by use of the conversion table stored in the EPROM 44. When the decoding process is correctly completed, the article information obtained as the result of conversion is transmitted to the host computer via the interface 45 and the buzzer 14 and indicator LED 15 inform the completion of the reading. On the other hand, if the decoding process is not correctly completed, the decoding process is repeated and then the buzzer 14 and indicator LED 15 inform the reading error.

FIG. 6 shows part of the light source controller 50 for controlling the illumination light source 7. The trigger switch 5 is connected in series with a resistor 21 between the power supply terminal Vcc and the ground terminal. A connection node between the trigger switch 5 and the resistor 21 is connected to the input terminal T of a monostable multivibrator circuit 24. A capacitor 22 and a resistor 23 are connected to set terminals R and R/C for setting the gain (time constant) of the monostable multivibrator circuit 24. The monostable multivibrator circuit 24 sets an output signal from the inverting output terminal thereof to a low level in response to an input signal of low level supplied when the trigger switch 5 is depressed and keeps the output signal at the low level until a preset period PT required for the area CCD 13 to repeat the image sensing operation elapses. The inverting output terminal of the monostable multivibrator circuit 24 is connected to a first input terminal of a NAND circuit 26. On the other hand, the input terminal T of the monostable multivibrator circuit 24 is connected to the second input terminal of the NAND circuit 26. The output terminal of the NAND circuit 26 is connected to the input/output port 46 and to the base of an NPN transistor 29 via a resistor 28. The base of the NPN transistor 29 is connected to the emitter thereof via a resistor 33, the emitter of the NPN transistor 29 is connected to the ground terminal, and the collector of the NPN transistor 29 is connected to the power supply terminal Vcc via a plurality of series circuits constructed by illumination LEDs 7a and resistors 7R serially connected to the illumination LEDs 7a.

In the circuit shown in FIG. 6, when the trigger switch 5 is turned on at time A, a switch signal S1 is lowered to the low level. The monostable multivibrator circuit 24 generates an output signal S2 of low level after the fall of the switch signal. The output signal S2 is kept at the low level for the above-described preset period PT of time even if the trigger switch 5 is immediately turned off at time B. An output signal S3 of the NAND circuit 26 is is set at the high level for a period from the time when one of the switch signal S1 and the output signal S2 falls until both of the signals rise. The transistor 29 supplies a drive current to the illumination LEDs 7a to activate or turn on the illumination LEDs when the output signal S3 of the NAND circuit 26 is set at the high level and interrupts the supply of the drive current to turn out the illumination LEDs 7a when the output signal of the NAND circuit 26 is set at the low level. That is, the illumination light source 7 is set in the de-activated state before the trigger switch 5 is turned on, and is lit or activated for at least the preset period PT after the trigger switch 5 is turned on, and is then de-activated. If the trigger switch 5 is turned on at time D and turned off at time F, the activation period of the illumination light source 7 is elongated by a period from time E which is set when the preset period PT has elapsed after time C to time F. The beams spot LEDs 8a and 8b are controlled to rapidly flash on and off when the illumination light source 7 is set in the de-activated state.

In the above embodiment, the 2-dimensional code scanner has a structure formed to accommodate all of the optical components and the reading control circuit for sensing an image of the 2-dimensional code via the reading window 4a and converting the sensed image into image data when the reading window 4a is set within a distance of 10 mm from the 2-dimensional code in the frame 4. Therefore, it becomes possible to form a 2-dimensional code scanner which is small, light and inexpensive.

Further, the operator can hold the 2-dimensional code scanner by hand and attain the 2-dimensional code reading operation by depressing the trigger switch with the reading window 4a set within a distance of 10 mm from the 2-dimensional code. At this time, a failure in the reading caused by inclination of the 2-dimensional code with respect to the plane of the reading window can be suppressed by setting the reading window 4a in close contact with the 2-dimensional code.

Further, since the distance between the reading window 4a and the 2-dimensional code is set in a range of as short as 10 mm at the time of reading, it is not necessary to effect the focusing and aperture adjustment according to a variation in the distance between the reading window 4a and the 2-dimensional code for each reading operation.

In this embodiment, the spot beam LEDs 8a and 8b are arranged to emit guide light beams which intersect each other in the position at a distance of 20 mm from the reading window 4a along the central axis which passes the center of the plane of the reading window 4a at right angles. Therefore, as the reading window 4a is set closer to the above position, the positional deviation of the 2-dimensional code from the center of the reading range becomes clearer.

Further, the NAND circuit 26 controls the illumination light source 7 according to the switch signal S1 from the trigger switch 5 and the output signal S2 from the monostable multivibrator 24. Therefore, even when the trigger switch 5 is momentarily turned on, the illumination light source 7 can be activated for the preset period PT required for effecting the image sensing operation. Further, if the trigger switch 5 is kept on, the illumination light source 7 can be kept in the activated state for a period longer than the preset period PT. As a result, the power consumption can be saved without degrading the reading speed or operability.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical code reader comprising:

a reading window;

a reading section for sensing an image of a 2-dimensional code via said reading window and for converting the sensed image into image data; and a portable frame having an opening used as said reading window, for accommodating said reading section;

wherein said reading section includes a trigger switch for issuing a reading instruction in a state where said reading window is set within a preset distance from the 2-dimensional code, an illumination light source for applying an illumination light via said reading window for a preset period after the reading instruction is issued by said trigger switch, image sensing means for sensing the image of the 2-dimensional code based on a reflected light obtained when the 2-dimensional code is illuminated by said illumination light source, and illumination light source controlling means for elongating the period of activation of said illumination light source when the reading instruction is continuously issued for a period longer than the preset period.

2. An optical code reader according to claim 1, further comprising a guide light source for emitting a guide light for guiding the 2-dimensional code into a reading range of said reading section.

3. An optical code reader according to claim 2, wherein said reading section includes guide light source controlling means for activating said guide light source before said illumination light source is turned on and for de-activating said guide light source before said illumination light source is turned on.

4. An optical code reader according to claim 2, wherein said guide light source includes a plurality of light emitting elements for emitting guide beam lights which intersect in position at a preset distance along a central axis passing the center of the plane of said reading window at right angles.

5. An optical code reader according to claim 1, wherein said reading means includes analyzing means for analyzing the image data to decode the 2-dimensional code.

6. An optical code reading method comprising steps of:

issuing a reading instruction in a state where a reading window is set within a preset distance from the 2-dimensional code;

applying an illumination light via said reading window for a preset period after the reading instruction is issued;

sensing an image of the 2-dimensional code based on a reflected light obtained via said reading window when the 2-dimensional code is illuminated by the illumination light;

converting the sensed image into image data; and elongating the period of applying the illumination light when the reading instruction is continuously issued for a period longer than the preset period.

* * * * *